(12) United States Patent
Switalski

(10) Patent No.: US 10,576,860 B2
(45) Date of Patent: Mar. 3, 2020

(54) VERTICALLY ADJUSTABLE HEAD RESTRAINT

(71) Applicant: WINDSOR MACHINE AND STAMPING (2009) LTD., Windsor (CA)

(72) Inventor: William Switalski, Windsor (CA)

(73) Assignee: WINDSOR MACHINE AND STAMPING (2009) LTD., Windsor, Ontario (CA)

(*) Notice: Subject to any disclaimer, the term of this patent is extended or adjusted under 35 U.S.C. 154(b) by 0 days.

(21) Appl. No.: 15/934,121

(22) Filed: Mar. 23, 2018

(65) Prior Publication Data

US 2018/0272910 A1    Sep. 27, 2018

Related U.S. Application Data

(60) Provisional application No. 62/477,178, filed on Mar. 27, 2017.

(51) Int. Cl.
| | |
|---|---|
| *B60N 2/806* | (2018.01) |
| *B60N 2/809* | (2018.01) |
| *B60N 2/812* | (2018.01) |
| *B60N 2/815* | (2018.01) |
| *B60N 2/818* | (2018.01) |
| *B60N 2/824* | (2018.01) |
| *B60N 2/894* | (2018.01) |
| *B60N 2/90* | (2018.01) |

(52) U.S. Cl.
CPC ............ B60N 2/815 (2018.02); B60N 2/818 (2018.02); B60N 2/894 (2018.02); *B60N 2002/952* (2018.02); *B60N 2205/20* (2013.01)

(58) Field of Classification Search
CPC ......... B60N 2/815; B60N 2/818; B60N 2/894
USPC ....................................................... 297/410
See application file for complete search history.

(56) References Cited

U.S. PATENT DOCUMENTS

| | | | | |
|---|---|---|---|---|
| 3,563,602 A * | 2/1971 | Ohta | ...................... | B60N 2/818 297/410 |
| 5,895,094 A * | 4/1999 | Mori | ...................... | B60N 2/818 297/410 |
| 7,316,455 B2 * | 1/2008 | Metz | ...................... | B60N 2/815 297/410 |

(Continued)

FOREIGN PATENT DOCUMENTS

| | | |
|---|---|---|
| DE | 10149455 A1 | 4/2003 |
| EP | 3059117 A1 | 8/2016 |
| WO | 2011107852 A1 | 9/2011 |

OTHER PUBLICATIONS

Search Report regarding related EP App. No. 18164072.3; dated Aug. 9, 2018; 9 pgs.

*Primary Examiner* — Rodney B White

(57) ABSTRACT

A head restraint assembly includes a base portion including a first post portion extending in a vertical direction. The assembly also includes a head restraint operatively coupled to the base portion. The assembly further includes a lock slide manually moveable between a locked condition and an unlocked condition, the locked condition disposing a portion of the lock slide within one of a plurality of recesses of the first post portion, the unlocked condition defined by removal of the lock slide from the plurality of recesses to allow adjustment of the head restraint in the vertical direction.

14 Claims, 8 Drawing Sheets

(56) References Cited

U.S. PATENT DOCUMENTS

| | | | |
|---|---|---|---|
| 7,878,597 B2* | 2/2011 | Bokelmann | B60N 2/829 |
| | | | 297/410 |
| 2006/0250017 A1* | 11/2006 | Otto | B60N 2/888 |
| | | | 297/410 |
| 2007/0200413 A1* | 8/2007 | Demick | B60N 2/815 |
| | | | 297/410 |
| 2008/0079294 A1* | 4/2008 | Humer | B60N 2/66 |
| | | | 297/216.12 |
| 2009/0184556 A1* | 7/2009 | Bokelmann | B60N 2/815 |
| | | | 297/410 |
| 2010/0078984 A1 | 4/2010 | Jammalamadaka et al. | |
| 2011/0148171 A1* | 6/2011 | Charles | B60N 2/818 |
| | | | 297/410 |
| 2014/0145489 A1* | 5/2014 | Wang | B60N 2/809 |
| | | | 297/410 |
| 2014/0182404 A1 | 7/2014 | Jeong | |
| 2014/0327288 A1* | 11/2014 | Groenninger | B60N 2/815 |
| | | | 297/410 |
| 2016/0250952 A1* | 9/2016 | Sasaki | B60N 2/815 |
| | | | 297/410 |
| 2017/0158100 A1* | 6/2017 | Brockman | B60N 2/809 |
| 2018/0022249 A1* | 1/2018 | Schwerma | A47C 7/38 |
| | | | 297/410 |

* cited by examiner

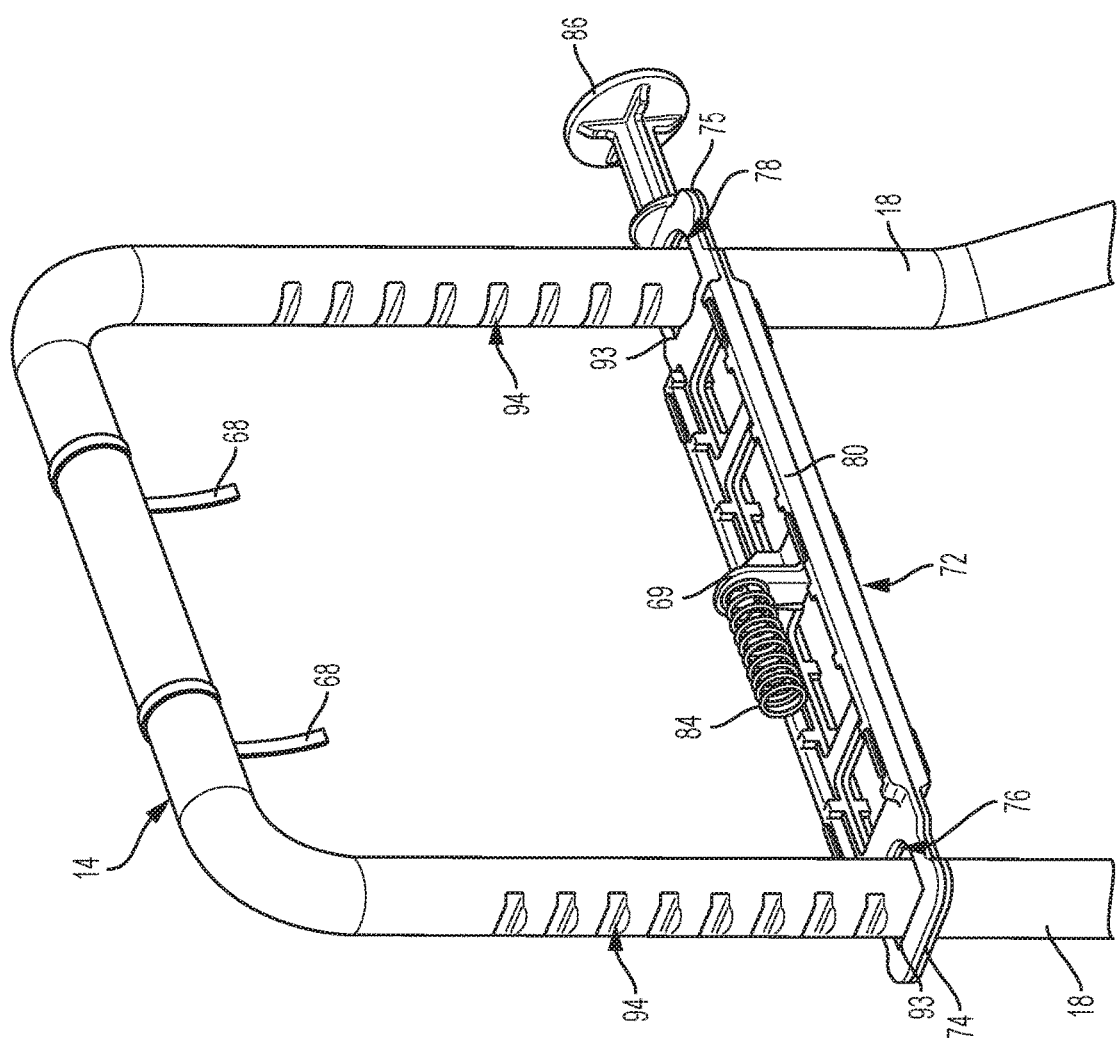

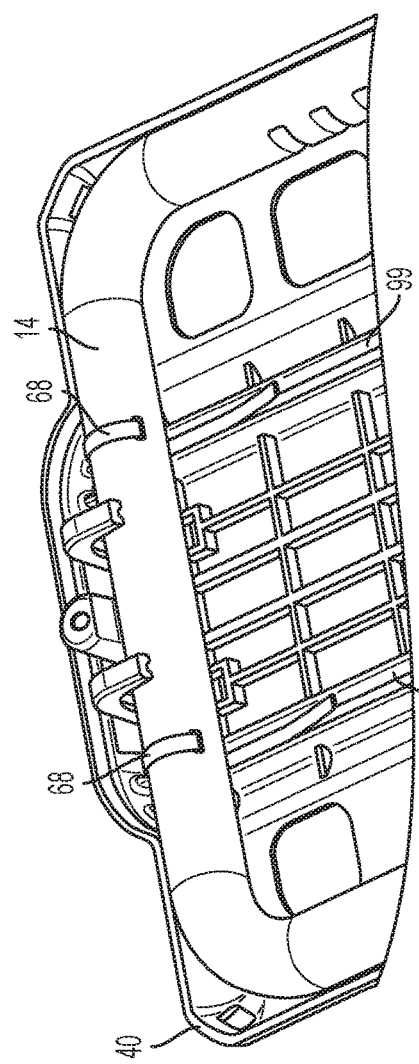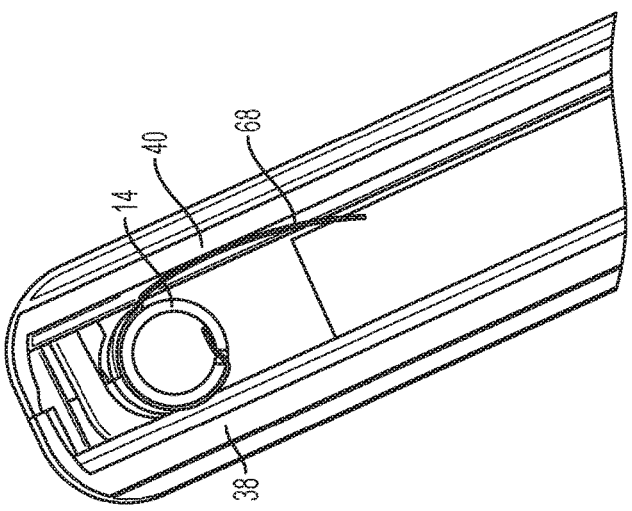

VERTICALLY ADJUSTABLE HEAD RESTRAINT

CROSS-REFERENCE TO RELATED APPLICATION

This patent application claims priority to U.S. Provisional Application No. 62/477,178, filed Mar. 27, 2017, which is incorporated herein by reference in its entirety.

FIELD OF THE INVENTION

The subject matter disclosed herein relates to vehicle head restraints and, more particularly, to a vehicle head restraint that is vertically translatable.

BACKGROUND

Many vehicles, such as automobiles, include a headrest or head restraint atop an occupant's seat and in a position adjacent the occupant's head. Head restraints are typically cushioned for comfort and may be height adjustable. For head restraints that are vertically adjustable, manual adjustment of the vertical position of the head restraint is often cumbersome for a user.

BRIEF DESCRIPTION OF THE DISCLOSURE

According to one aspect of the disclosure, a head restraint assembly includes a base portion including a first post portion extending in a vertical direction. The assembly also includes a head restraint operatively coupled to the base portion. The assembly further includes a lock slide manually moveable between a locked condition and an unlocked condition, the locked condition disposing a portion of the lock slide within one of a plurality of recesses of the first post portion, the unlocked condition defined by removal of the lock slide from the plurality of recesses to allow adjustment of the head restraint in the vertical direction.

According to another aspect of the disclosure, a head restraint assembly that is manually adjustable in a vertical direction, the head restraint assembly including a base portion including a first post portion and a second post portion, each post portion extending in a vertical direction. The head restraint assembly also includes a head restraint housing having a front shell and a rear shell operatively coupled to each other, the first and second post portions extending through respective apertures defined by a front shell and a rear shell. The head restraint assembly further includes a lock slide extending horizontally from a first end to a second end, the lock slide defining a first aperture with a first lock slide edge and a second aperture with a second lock slide edge, the lock slide manually moveable between a locked condition and an unlocked condition, the locked condition disposing the first lock slide edge within one of a plurality of recesses of the first post portion and disposing the second lock slide edge within one of a plurality of recesses of the second post portion, the unlocked condition defined by removal of the lock slide from the plurality of recesses to allow adjustment of the head restraint in the vertical direction.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 4 is a perspective view of a lock slide of the lock slide assembly, the lock slide connected to an armature;

FIG. 7 is a perspective view of an armature biasing assembly;

FIG. 8 is a side, cross-sectional view of the armature biasing assembly;

The detailed description explains embodiments of the invention, together with advantages and features, by way of example with reference to the drawings.

DETAILED DESCRIPTION

Figure 1:
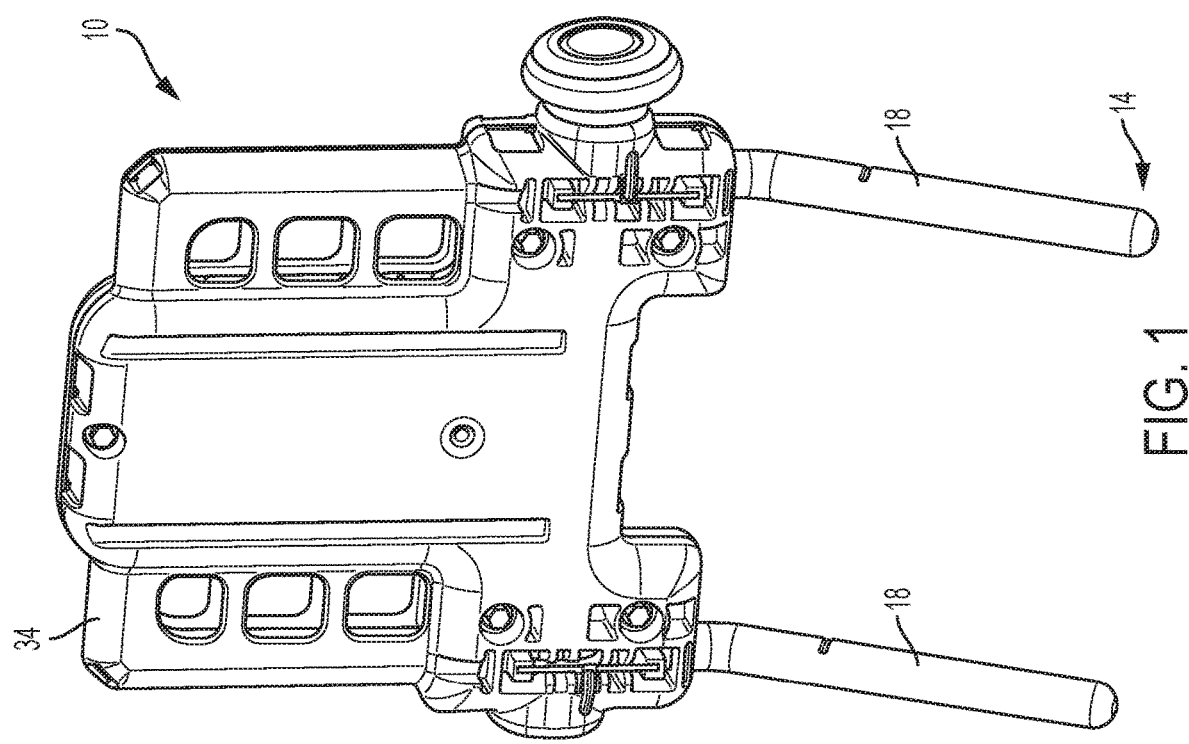
FIG. 1 is a front perspective view of a head restraint with a cover removed to illustrate a housing.

Referring FIG. 1, a head restraint assembly 10 is schematically depicted. The head restraint assembly 10 includes a base portion 14 (may also be referred to as an "armature") that is mountable to a vehicle seat (not illustrated) and, more specifically, to the upper portion of the seatback of the vehicle seat. In the illustrated embodiment, the base portion 14 includes two post members 18 that are mounted, or mountable, to the top of the seatback of the vehicle seat, as understood by those skilled in the art. Each of the post members 18 extends into a respective hole formed in the top of the seatback to attach the head restraint assembly 10 to the vehicle seat.

The head restraint assembly 10 includes a housing 34 that provides rigid structure and partially encloses a number of components, as will be described in detail below. The head restraint assembly 10 also includes cushioning and a head restraint cover (not shown) that are mounted with respect to the housing 34 for movement therewith. The head restraint cushion is comprised of a soft foam material or a like material to provide a cushion between the head of a human occupant of the vehicle seat and the housing 34. The head restraint cover covers at least part of the cushion and the housing to enhance the aesthetics of the head restraint. Exemplary cover materials include cloth, vinyl, leather, etc.

The housing is operatively coupled to the base portion 14 such that the housing 34 (and the rest of the overall head restraint, including the cushion and cover) is selectively translatable in a substantially vertical direction (i.e., two-way movement along longitudinal direction of post members 18) with respect to the base portion 14 and, therefore, is also selectively translatable with respect to the seatback portion of the vehicle seat. More specifically, the housing 34 is mounted with respect to the base portion 14 and selectively translatable with respect to the base portion 14.

Figure 2:
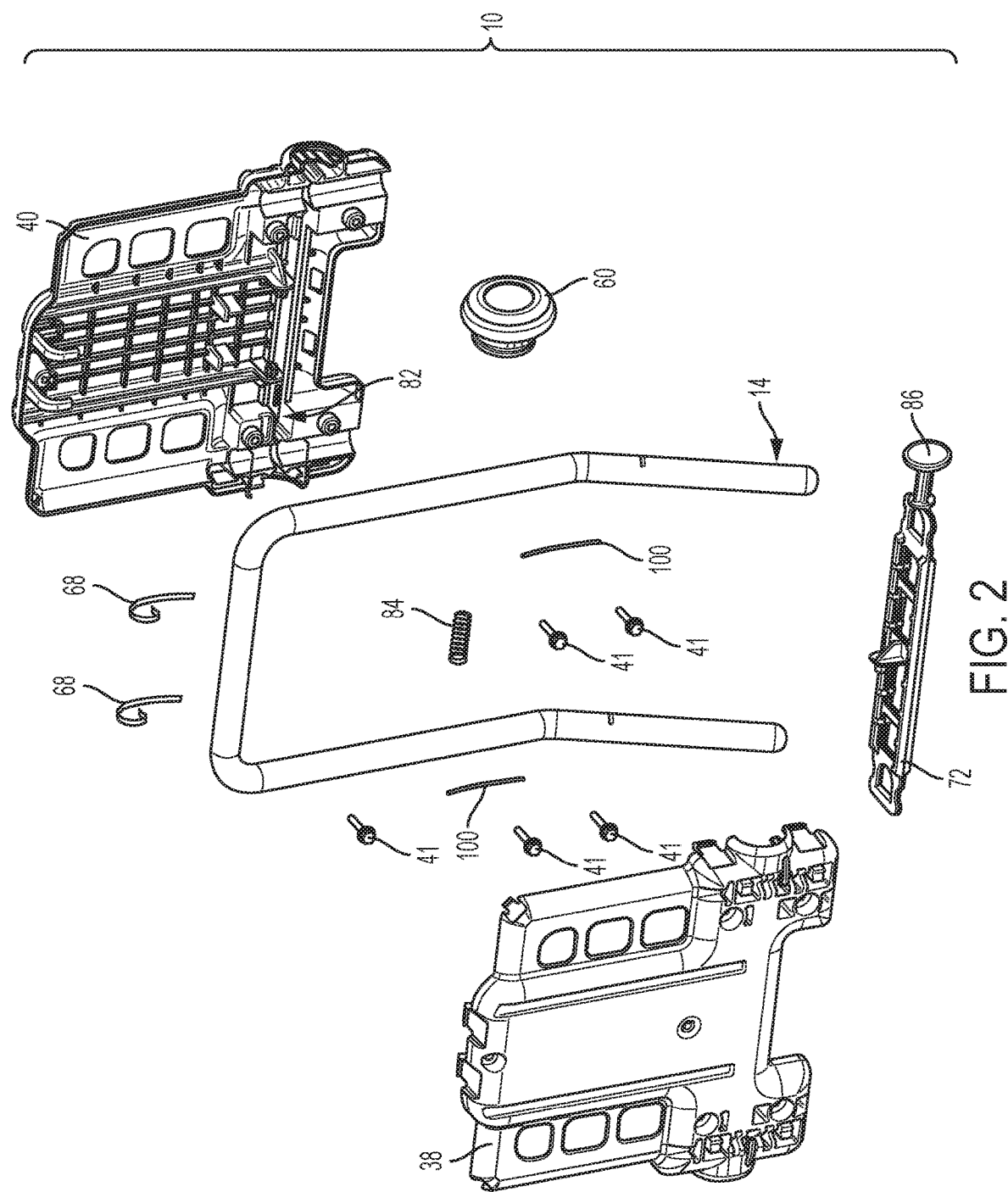
FIG. 2 is a disassembled view of the head restraint.
Figure 3:
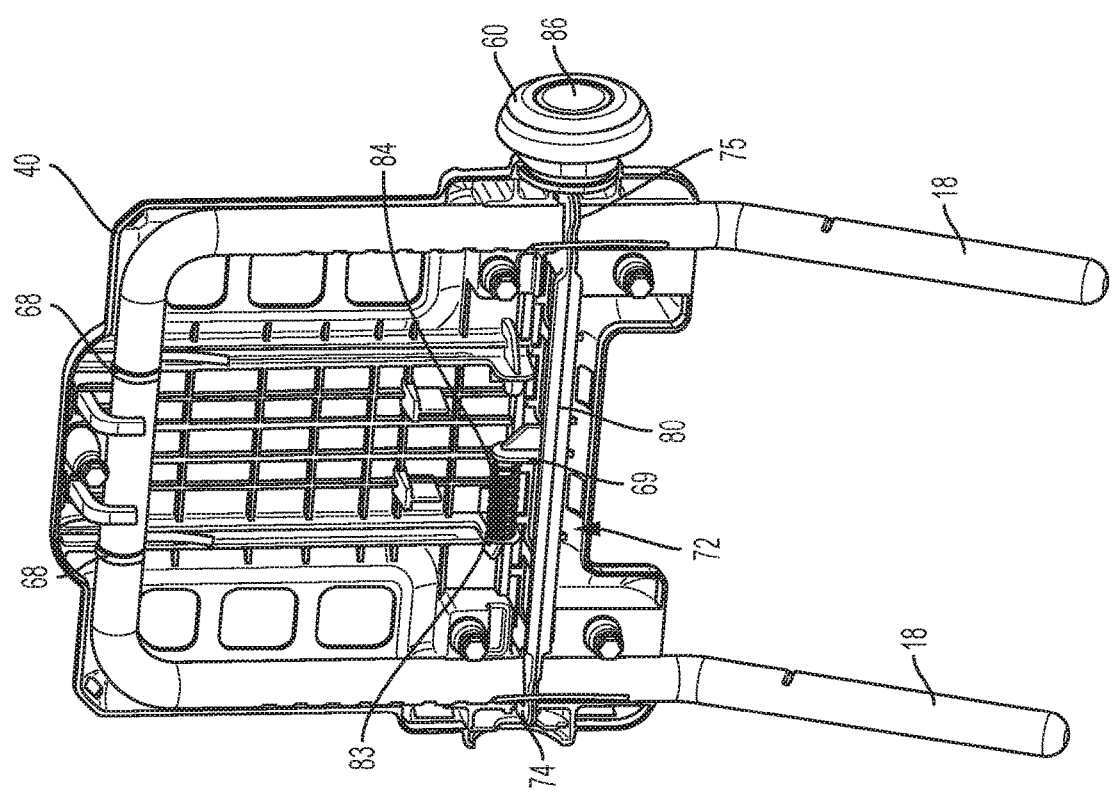
FIG. 3 is a perspective view with a portion of the housing removed to illustrate a lock slide assembly of the head restraint.
Figure 10:
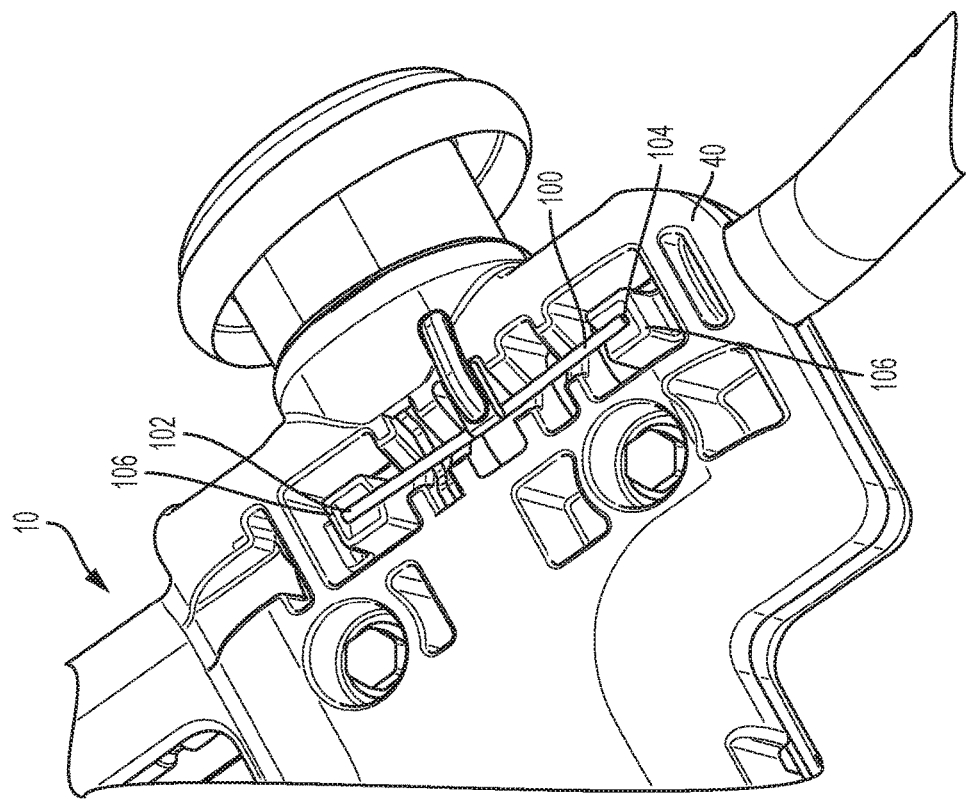
FIG. 10 is a perspective view of a push button actuator and adjustment biasing assembly.

FIG. 2 illustrates the head restraint assembly 10 in a disassembled view to illustrate several internal components that will be described in detail herein. As shown, the housing 34 includes a front shell 38 and a rear shell 40. In FIG. 2, the front shell 38 and the rear shell 40 are separated from each other to illustrate the internal components, but in an assembled condition, the front shell 38 and the rear shell 40 are coupled to each other with mechanical fasteners 41 extending through at least a portion of the front shell 38 and the rear shell 40 (FIGS. 1 and 10). For example, screws, bolts, nuts or the like may be employed as the mechanical fasteners 41 to secure the front shell 38 to the rear shell 40. Although it is contemplated that various suitable materials for the mechanical fasteners 41 may be employed, in one embodiment the mechanical fasteners 41 are formed of low carbon steel.

As will be described in detail herein, a lock slide 72 is disposed at least partially within the housing 34 and associated with the base portion 14 to facilitate manual vertical adjustment of the housing 34 which caused vertical adjustment of the overall head restraint. The other elements illustrated in the disassembled view of FIG. 2, and described herein, are a push button bezel 60, a push button 86 integrally formed with the lock slide 72, a lock slide spring 84, journal friction springs 100, and armature biasing members 68.

Referring now to FIGS. 3-6, the lock slide 72 is illustrated in greater detail. The lock slide 72 extends from a first end portion 74 to a second end portion 75 and receives the post members 18 of base portion 14 through a first aperture 76 and a second aperture 78. The lock slide 72 includes a main portion 80 disposed at least partially within the housing (i.e., between the front shell 38 and the rear shell 40). In some embodiments, a cavity 82 is defined by at least one of the front shell 38 and the rear shell 40 for the lock slide 72 to be seated within. The lock slide spring 84 is in abutment with, or operatively coupled to, a protrusion surface 69 extending substantially perpendicularly from the main portion 80 of the lock slide 72. The lock slide spring 84 is also in abutment with at least one inner wall 83 of the front shell 38 and/or the rear shell 40.

The push button 86 is formed as part of the lock slide 72 at the second end portion 75 and is configured to be secured within the push button bezel 60. A portion of the push button bezel 60 is sandwiched by the front shell 38 and the rear shell 40 to operatively couple the push button bezel 60 to the head restraint assembly 10. The push button bezel 60 is located at an exterior location of the head restraint, such that it is accessible to a user. The push button bezel 60 defines an aperture that allows the push button 86 to be visible and accessible to a user for depression thereof. The lock slide spring 84 biases the lock slide 72, and therefore the push button 86, in the direction of the push button bezel 60.

Figure 6:
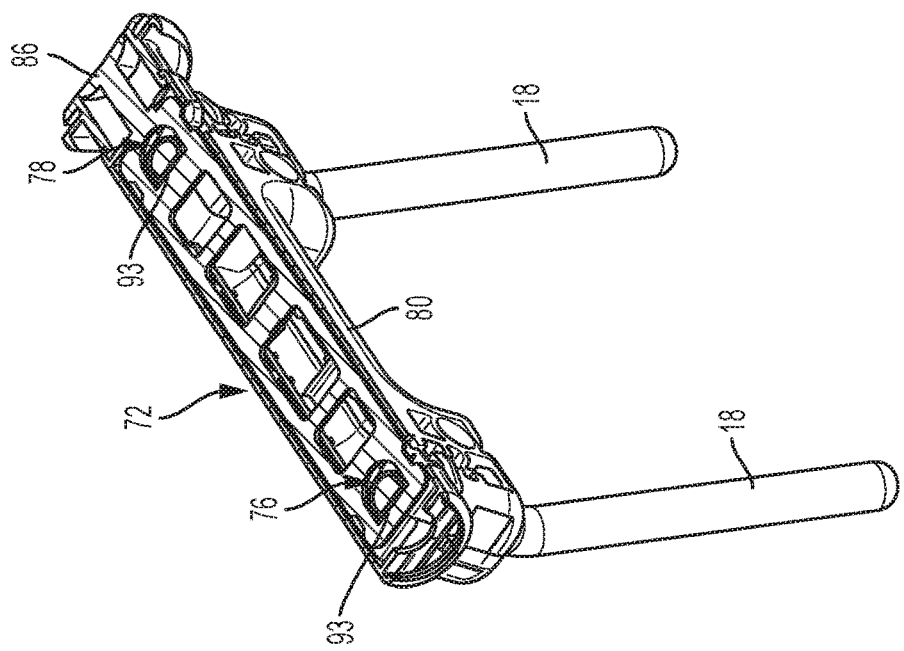
FIG. 6 is a cross-sectional view of the lock slide assembly illustrating another aspect of the disclosure.
Figure 5:
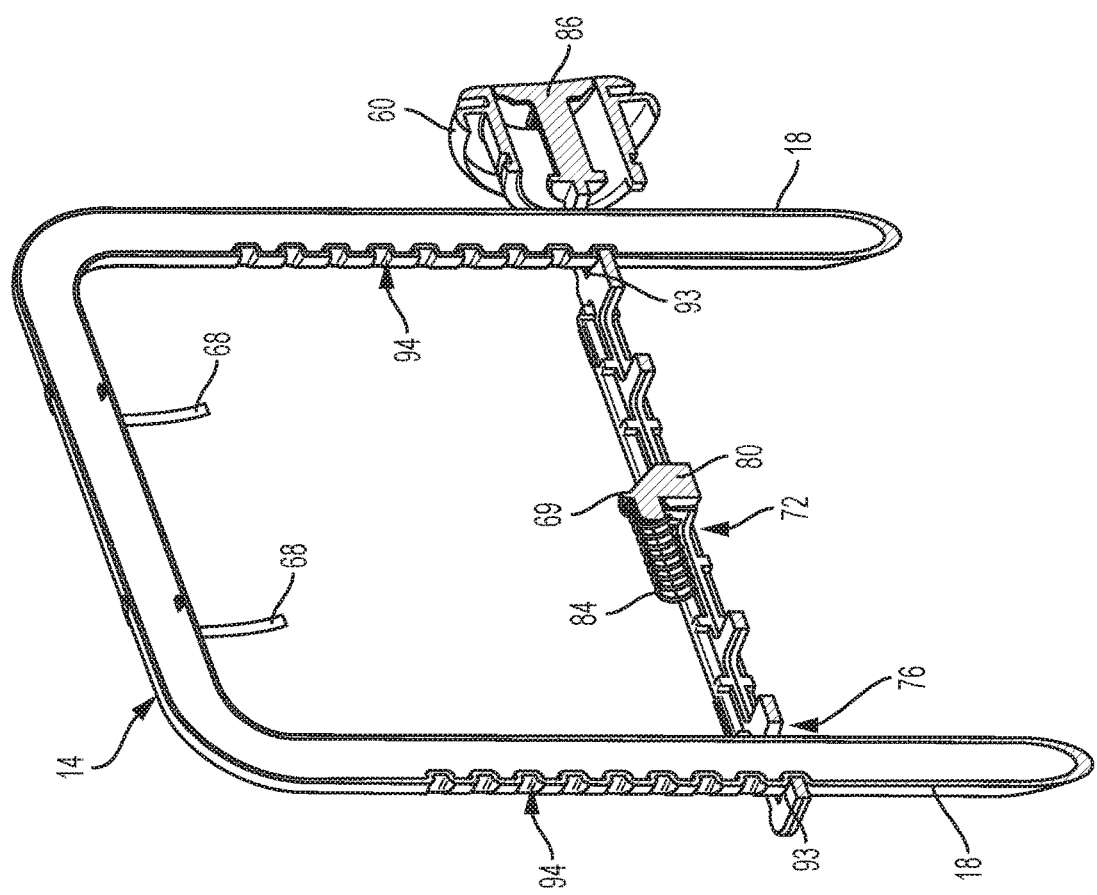
FIG. 5 is a cross-sectional view of the lock slide assembly.

The apertures 76, 78 of the lock slide 72 are defined by one or more edges 93 that engage recesses 94 of the post members 18 to fix a vertical position of the head restraint, as shown best in FIGS. 4 and 6. Upon depression of the push button 86 by a user, the biasing forces of the lock slide spring 84 may be overcome to remove the edge(s) 93 of the lock slide 72 from the recesses 94 of the post members 18. Removal from the recesses 94 allows substantially vertical adjustment of the head restraint until a desired position is reached. Once in the desired position, the edge(s) 93 of the lock slide 72 is able to be disposed within another recess 94 of the post members 18 upon release of the push button, as the lock slide spring 84 returns the lock slide 72 to the original position.

Figure 9:
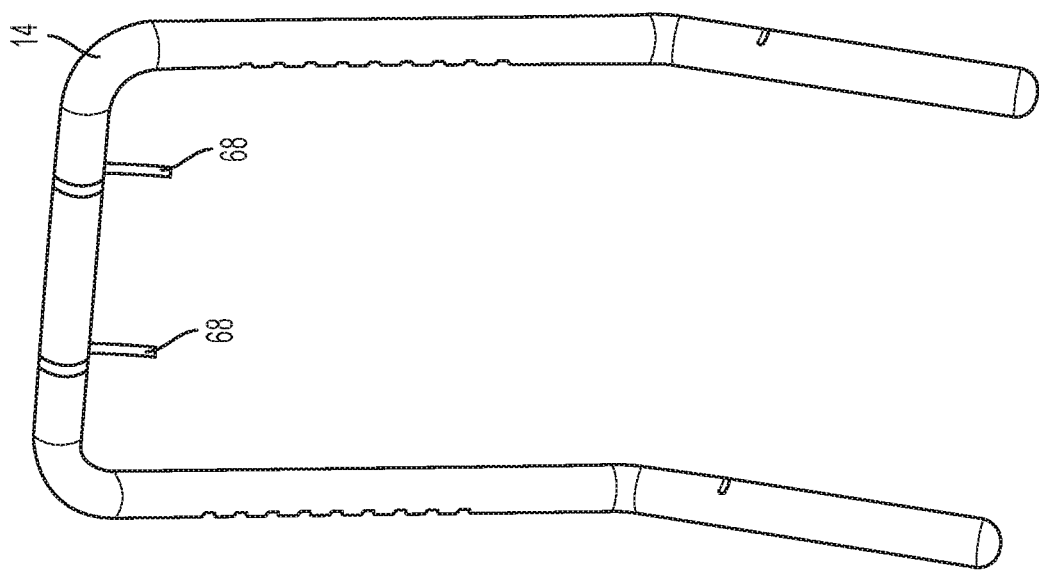
FIG. 9 is a perspective view of the armature biasing assembly.

Referring now to FIGS. 7-9, the armature biasing members 68 are illustrated in greater detail. The armature biasing members 68 are hook-like resilient members that may be formed of various suitable resilient materials capable of biasing the armature 14. In the illustrated embodiment, two armature biasing members 68 are shown, but it is to be appreciated that more or fewer members may be employed in other embodiments. The armature biasing members 68 are placed over the horizontal portion of the armature 14 during assembly and into contact with the rear shell 40. As the housing 34 moves up and down, the armature biasing members 68 ensure that the armature 14 is biased to be in contact with the front shell 38 to maintain constant engagement. This advantageously avoids a gap that would otherwise lead to rattle or other undesirable sounds that may be present during operation of the head restraint.

A portion of the armature biasing members 68 are positioned within grooves 99 defined by the rear shell 40. The grooves 99 allow the armature biasing members 68 to be horizontally fixed relative to the rear shell 40, particularly during vertical movement of the housing 34. The grooves 99 guide the armature biasing members 68 during vertical adjustment of the head restraint assembly. As described above, contact between the armature 14 and the front shell 38 is maintained by the biasing force of the armature biasing members 68 at any vertical position of the head restraint assembly.

Figure 11:
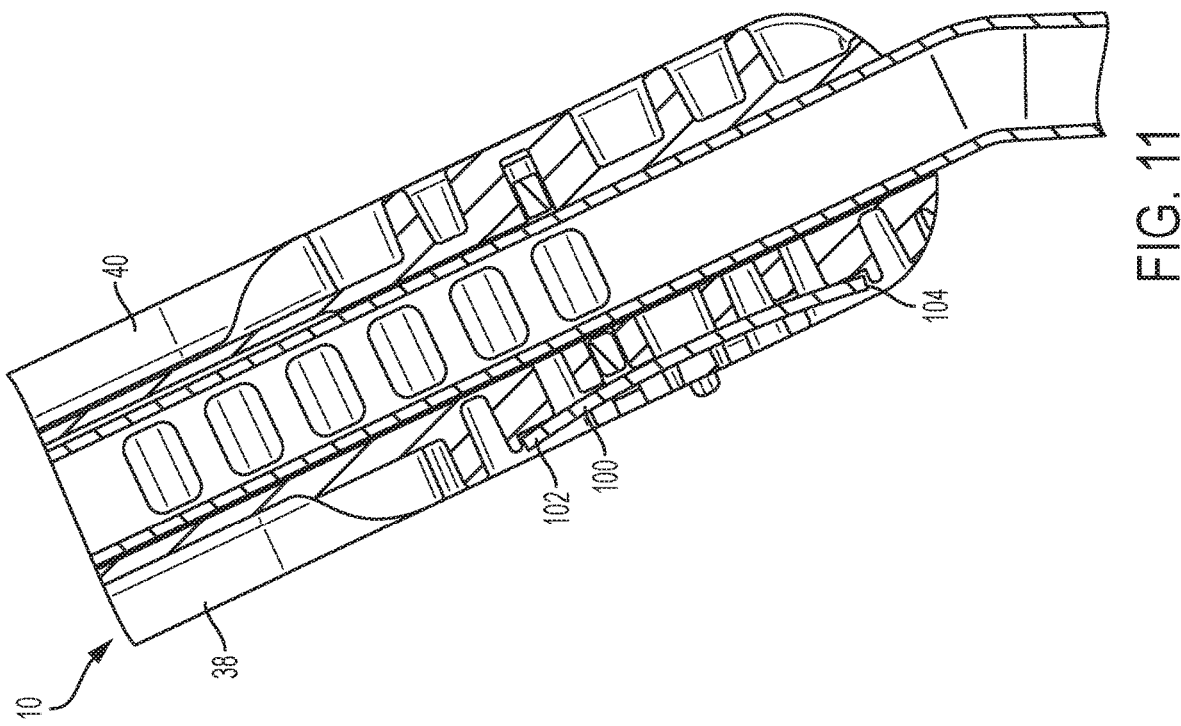
FIG. 11 is a side, cross-sectional view of the adjustment biasing assembly.

Referring now to FIGS. 10 and 11, a portion of the head restraint assembly 10 is illustrated in an assembled condition. The assembly includes a journal friction spring 100 on each side of the housing 34. In the illustrated embodiment, the journal friction spring 100 is disposed within the front shell 38, but it is contemplated that it may be disposed within the rear shell 40. The journal friction spring 100 extends from a first end 102 to a second end 104. Each end 102, 104 is seated within a recess of respective block members 106 that are formed within the front shell 38.

The journal friction spring 100 establishes a consistent manual adjustment effort by the user. Inconsistent manual adjustment effort is present in prior designs due to thermal growth of materials that are part of the head restraint assembly 10. In particular, the housing 34 may be designed to have a slight clearance with the armature 14 in certain ambient conditions, but extreme cold or heat may alter the clearance substantially enough to alter the manual adjustment effort required to adjust the head restraint. In the embodiments disclosed herein, the journal friction spring(s) 100 are configured to maintain a constant manual adjustment effort. The dimensions of the journal friction spring(s) 100 may be easily customized to provide different manual adjustment efforts and to be adapted to different head restraint assembly designs.

Advantageously, the embodiments described herein facilitate minimal effort required to translate the head restraint vertically with operation of the push button 86.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A head restraint assembly comprising:
   a base portion including a first post portion extending in a vertical direction;
   a head restraint operatively coupled to the base portion;
   a lock slide manually moveable between a locked condition and an unlocked condition, the locked condition disposing a portion of the lock slide within one of a plurality of recesses of the first post portion, the unlocked condition defined by removal of the lock slide from the plurality of recesses to allow adjustment of the head restraint in the vertical direction;
   a second post portion, the first and second post portions extending through respective apertures defined by a front shell and a rear shell, the front shell and the rear shell operatively coupled to each other; and
   at least one armature biasing member surrounding a portion of the base portion and biasing the base portion to be in constant contact with the front shell.

2. The head restraint assembly of claim 1, wherein the lock slide extends horizontally from a first end to a second end, the lock slide defining a first aperture with a first lock slide edge, the first lock slide edge being the portion of the lock slide moveable within and out of the plurality of recesses of the first post portion.

3. The head restraint assembly of claim 2, wherein the lock slide includes a push button integrally formed at the second end thereof, the push button accessible to a user for manually moving the lock slide out of engagement with the plurality of recesses of the first post portion.

4. The head restraint assembly of claim 3, further comprising a push button bezel operatively coupled to the front shell and the rear shell, the push button disposed within the push button bezel.

5. The head restraint assembly of claim 3, further comprising a lock slide spring in contact with the lock slide to bias the lock slide to be in the locked condition, depression of the push button overcoming a spring force of the lock slide spring to move the lock slide to the unlocked condition.

6. The head restraint assembly of claim 1, wherein a portion of the at least one armature biasing member is disposed within a groove defined by the rear shell, the groove retaining the armature biasing member(s) in a horizontal direction during vertical movement of the head restraint.

7. A head restraint assembly comprising:
   a base portion including a first post portion extending in a vertical direction;
   a head restraint operatively coupled to the base portion;
   a lock slide manually moveable between a locked condition and an unlocked condition, the locked condition disposing a portion of the lock slide within one of a plurality of recesses of the first post portion, the unlocked condition defined by removal of the lock slide from the plurality of recesses to allow adjustment of the head restraint in the vertical direction;
   a second post portion, the first and second post portions extending through respective apertures defined by a front shell and a rear shell, the front shell and the rear shell operatively coupled to each other; and
   at least one journal friction spring disposed within at least one of the front shell and the rear shell to control a manual adjustment effort.

8. The head restraint assembly of claim 1, wherein the lock slide defines a second aperture with a second lock slide edge, the second lock slide edge being the portion of the lock slide moveable within and out of the plurality of recesses of the second post portion.

9. A head restraint assembly that is manually adjustable in a vertical direction, the head restraint assembly comprising:
   a base portion including a first post portion and a second post portion, each post portion extending in a vertical direction;
   a head restraint housing having a front shell and a rear shell operatively coupled to each other, the first and second post portions extending through respective apertures defined by a front shell and a rear shell;
   a lock slide extending horizontally from a first end to a second end, the lock slide defining a first aperture with a first lock slide edge and a second aperture with a second lock slide edge, the lock slide manually moveable between a locked condition and an unlocked condition, the locked condition disposing the first lock slide edge within one of a plurality of recesses of the first post portion and disposing the second lock slide edge within one of a plurality of recesses of the second post portion, the unlocked condition defined by removal of the lock slide from the plurality of recesses to allow adjustment of the head restraint in the vertical direction; and
   at least one armature biasing member surrounding a portion of the base portion and biasing the base portion to be in constant contact with the front shell.

10. The head restraint assembly of claim 9, wherein the lock slide includes a push button integrally formed at the second end thereof, the push button accessible to a user for manually moving the lock slide out of engagement with the plurality of recesses of the first post portion.

11. The head restraint assembly of claim 10, further comprising a push button bezel operatively coupled to the front shell and the rear shell, the push button disposed within the push button bezel.

12. The head restraint assembly of claim 11, further comprising a lock slide spring in contact with the lock slide to bias the lock slide to be in the locked condition, depression of the push button overcoming a spring force of the lock slide spring to move the lock slide to the unlocked condition.

13. The head restraint assembly of claim 9, wherein a portion of the at least one armature biasing member is disposed within a groove defined by the rear shell, the groove retaining the armature biasing member(s) in a horizontal direction during vertical movement of the head restraint.

14. A head restraint assembly that is manually adjustable in a vertical direction, the head restraint assembly comprising:
   a base portion including a first post portion and a second post portion, each post portion extending in a vertical direction;
   a head restraint housing having a front shell and a rear shell operatively coupled to each other, the first and second post portions extending through respective apertures defined by a front shell and a rear shell;
   a lock slide extending horizontally from a first end to a second end, the lock slide defining a first aperture with a first lock slide edge and a second aperture with a second lock slide edge, the lock slide manually moveable between a locked condition and an unlocked condition, the locked condition disposing the first lock slide edge within one of a plurality of recesses of the first post portion and disposing the second lock slide edge within one of a plurality of recesses of the second post portion, the unlocked condition defined by removal of the lock slide from the plurality of recesses to allow adjustment of the head restraint in the vertical direction; and at least one journal friction spring disposed within at least one of the front shell and the rear shell to control a manual adjustment effort.

\* \* \* \* \*